June 4, 1957    J. H. WILSON    2,794,760
METHOD OF MAKING FIBER REINFORCED PLASTIC PARTS
Filed June 10, 1953
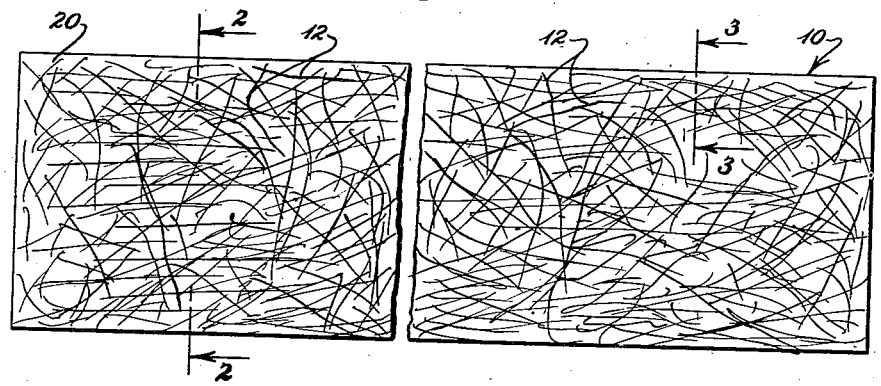
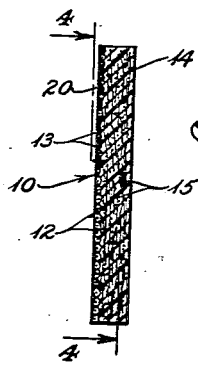
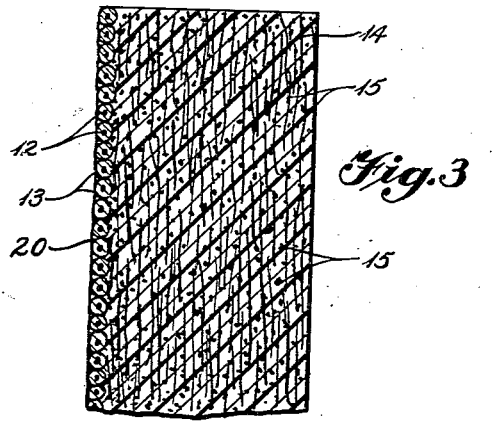
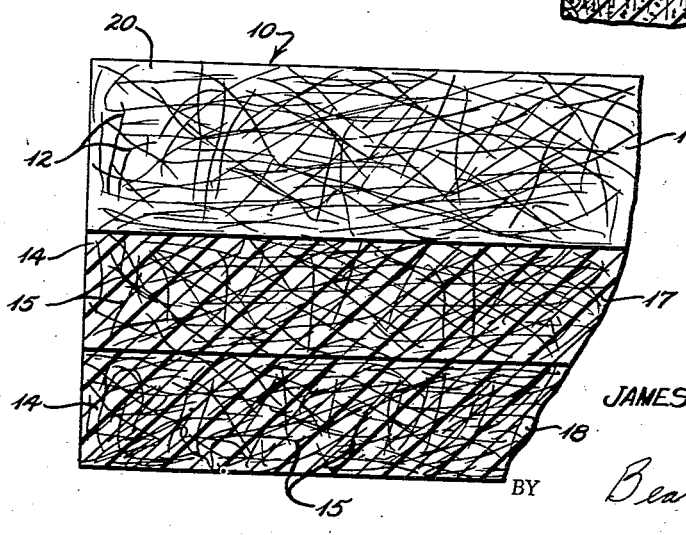
INVENTOR
JAMES HARRISON WILSON
BY
ATTORNEYS

2,794,760
METHOD OF MAKING FIBER-REINFORCED PLASTIC PARTS

James Harrison Wilson, Sturgis, Mich., assignor to Sturgis Posture Chair Company, Sturgis, Mich., a corporation Application June 10, 1953, Serial No. 360,710

4 Claims. (Cl. 154—110)

This invention relates to a method of producing a new type of surface on fiber-reinforced plastic parts. This new surface has the advantage of being abrasion resistant, and at the same time will successfully camouflage any scratches or other marks which are made on it.

Fiber-reinforced plastics are common in the art. An early development in the resin-casting art was the addition of chopped string to plastics as a strengthening material. Many other fibers are now used, such as woven cloth, paper, paper pulp, glass wool, and woven glass cloth. These fibrous materials particularly contribute to the impact strength of the finished piece, and in addition, often give a decorative appearance. However, the layer of material at the surface of the finished piece is still the plastic alone and the surface characteristics are, in general, not improved by the reinforcing materials, even though the strength of the piece as a whole is improved.

The lack of surface strength in plastics has occasioned much technological difficulty. Where an abrasion resistant surface is desired, the entire piece must be molded and cured so as to produce the essential surface characteristics. This is usually done at the sacrifice of other desirable properties in the piece as a whole. A hard, lustrous, smooth surface often can be produced only when an amount of brittleness is introduced into the piece.

The object of this invention is to produce a surface in a fiber-reinforced plastic which is exceptionally resistant to abrasion, with no sacrifice in other strength characteristics.

A further object of the invention is to produce a fiber-reinforced plastic molding which not only possesses unusual surface toughness and resistance to abrasion, but also completely camouflages any abrasion which does occur.

Another object of the invention is to produce a plastic surface which is pleasing in appearance, smooth to the touch, and clean-looking, as well as resistant to abrasion.

These and other objects of the invention are achieved by producing a plastic in which reinforcing fibers in particulate, individual form, are visible and readily discernible at the surface, and which fibers form an integral part of the surface and of the entire plastic body. This new type of surface is produced by a new step in the conventional molding method, namely, applying a coating resin, characterized by its resinophobic properties after setting, to coat the surface fibers only, which step renders the surface fibers non-wettable by the molding resin, and so leaves them "high and dry" during the curing of the resin. The surface thus produced presents a unique appearance. There are visible at the surface many individual fibers, yet each is coated with a resin and each is an integral part of the casting and is inseparable therefrom. Where short lengths of chopped glass fiber are used as the reinforcing medium, the surface has the appearance of having been badly scratched in many different directions, then painted over so that the entire surface is uniform in color. This surface and its method of production may be best understood by a consideration of the accompanying drawing, and by a comparison of the process of the present invention with the processes of the prior art.

In the drawing,

Figure 1 is a plan view of a flat panel made according to the invention.

Figure 2 is a cross-sectional view of the panel shown in Figure 1, taken along 2—2 in Figure 1.

Figure 3 is a greatly enlarged cross-section of the panel of Figure 1, taken along 3—3 in Figure 1.

Figure 4 is a section of the view in Figure 2, illustrating the appearance of the fiber-reinforced plastic at various points in its thickness.

In the usual process of producing an article from a fiber-reinforced plastic, for instance from a glass fiber-reinforced polyester, a "preform" is made by felting glass fiber into the desired shape. The fibers in the preform are temporarily adhered in shape by a binder material. The preform is saturated or impregnated with the polyester, either during felting or afterward, and the preform is then subjected to heat and pressure in a die to cure the resin. In the final article, no glass fibers are visible as such, as a general rule, and none appear at the surface. The layer of material at the surface is the polyester alone.

In the improved process of this invention, a different process is followed. The glass fibers, with a suitable binder, are felted onto a shaped screen base to make a preform. The preform is then sprayed with a solution of a water soluble resin. This resin is applied so as to coat the surface fibers only. The preform may then be set by a short baking period. The set preform is then placed in a mold, resin is poured into the mold, and the resin is then cured. Because the surface fibers are coated with the water soluble resin, they are not wet by the molding resin the coating resin being therefore resinophobic, and so stand out in particulate form in the finished piece. The surface effect thus produced is startling in appearance. The surface appears lined and rough, since the individual fibers appear to stand out. These fibers at the surface impart unusual toughness to the surface. An additional advantage is that scratches made in the surface are barely discernible, since the surface already appears to be a mass of ridges and furrows, although it is smooth to the touch.

Figure 1 illustrates a flat panel 10 made according to the improved process of this invention. The drawing attempts to illustrate the finish on surface 20, but it is only an approximation. It must be seen to be appreciated. The individual fibers 12 are visible on the surface. The surface 20 is smooth to the touch but the mass of fibers 12 gives the impression that it would be very rough.

Figure 2 is a cross-sectional view of Figure 1, taken along 2—2. The surface fibers 12 blend into the solid body of the panel. The actual structure is better shown in the enlarged cross-section view of Figure 3. There the surface fibers 12 are shown coated with plastic 13. The interior reinforcing fibers 15, are not so coated, but are merely embedded in the molding resin 14. It will be noted that the molding resin partially surrounds the plastic-coated surface fibers, but that these coated fibers form the greater part of the panel surface 20.

Figure 4 shows layers 16, 17 and 18 in a sectional view taken from Figure 2 along 4—4. The panel designated by the numeral 16 is another view of the rough-appearing surface 20. The two panels 17 and 18 illustrate that the body of the panel is homogeneous except at the surface, with fibers 15 embedded in the molding resin 14 throughout.

In the process of the invention, glass fiber cut in 2 inch lengths is preferred, since this length has optimum strength characteristics, coupled with a pleasing surface appearance due to the fiber length. However, glass fiber of any length may be used. Extremely short pieces of glass fiber may be used but do not produce the flowing type of surface lines which are obtained from the longer pieces. Any other suitable fibers may also be used. For instance, the use of asbestos is satisfactory, and other mineral fibers may be substituted where the particular properties which they impart to the finished product are desired. Chopped string and other cellulose fibers may also be used, but do not produce as pleasing a surface effect as does glass fiber.

As the binder for the fibers, either a dry binder or a wet binder is suitable. A polyester dry powder may be used, such as Atlac 395, in an amount varying between 2% and 5% by weight of the dry fiber. Plaskon and Selectron resins may also be used. The binder may be sifted into the preform along with the fibers, or may be applied later, after the fibers are in place. Several commercial emulsions also provide satisfactory binders, and these are well known in the art. The binder, as is understood in the art, simply holds the preform together. The essential requirement of the binder is that it be compatible with the final resin used for molding.

The water soluble resin used for spraying the surface fibers may be any of the well known water soluble resins. Selectron 5501 is a preferred resin, but Geon and Plaskon resins may also be used. For spraying, the Selectron resin is preferably cut back with styrene. Titanium pigment may be added for decorative effect. The function of the water soluble resin is to form an outer surface on the glass or other fiber to prevent wetting by the molding resin. The titanium pigmented resin has the effect of making the fibers appear to stand out from the surface more, as well as producing a more desirable decorative effect due to the pigmentation. It is possible to use Selectron 5003 for the water soluble resin as well as for the molding resin. This is possible because after the water soluble resin has been applied to the preform, the preform is set by a short oven bake. This sets both the binder and the water soluble resin on the surface fibers. The resin coating is then not wet by the molding resin.

A wide variety of molding resins, all known in the prior art, may be used, provided the cured resin has sufficient strength for the use intended, and has the proper viscosity for molding. A table of the typical resins follows:

Resin type:
 Phenol formaldehyde _____ Bakelite BV17085
 Melamine formaldehyde _____ Melmac 405
 Polyester _____ Laminac 4128
 Polyester _____ Selectron 5003
 Silicone _____ Dow 2104

Other resin types in common used for making fiber-reinforced plastic pieces which may be used in the improved process of the present invention are the alkyd resins, styrenated alkyds, allyl resins, epoxy resins, commercial unsaturated polyesters extended with monomeric styrene and containing about 0.8% benzoyl peroxide as a catalyst, and Vibrin. The particular resin used is not critical and undesirable types for particular uses may be readily discarded. For instance, Selectron 5005 produces a strong laminate, but is so viscous that it produces a glass wash in the preform and is therefore not desirable.

It is now conventional to use a size on the fibers to get a good bond with the molding resin, and the use of a size in this invention presents no difficulties. The saturated and unsaturated silanes have proved particularly efficacious and are among the many bonding agents which are suitable. These are often applied to the fiber by the commercial supplier of fiber, and need be of no concern as to the process of this invention.

The following examples of typical production runs will make the method more clear.

*Example 1*

A flat panel, suitable for use as a baseboard in buildings or as interior trim in a car, is produced by first felting a flat panel-shaped member from cut lengths of random glass fibers. A preform machine of the usual type is used for this purpose. The fibers are fed into the machine and are drawn and held in place by suction over a screen. The powdered binder is fed on during forming. A polyester dry powder, such as Atlac 395, is used as the binder, in an amount equivalent to 2% by weight of the dry glass fiber.

The preform is then sprayed with a water soluble resin so that the surface fibers are coated with the solution. A water solution of Selectron 5501 is suitable, and this may be pigmented with titanium if an additional decorative effect is desired. The preform is then set in the desired shape by an oven bake at 300° to 350° F. for about one minute.

The preform may then be removed from its screen base, and placed in a mold. Selectron 5003, a polyester resin, is then poured into the mold. The panel is then cured in the mold at 240° F. for about 3 minutes at 50 p. s. i.

The panel thus produced preferably has about a 32% glass fiber content.

*Example 2*

A base for a swivel-type chair is formed by making a preform of 2 inch lengths of glass fiber on a screen base. A dry binder is fed into the preform machine with the glass fiber, and so is interspersed among the fibers in the preform. The dry binder amounts to about 2½% of the weight of the dry glass fiber. The preform is sprayed with a solution of Selectron 5003, so as to coat the surface fibers. The coating resin and the binder are then set by an oven bake at 350° F. for about a minute.

The preform is then placed in a mold, saturated with Selectron 5003, and the resin is then cured.

The resulting chair base has a surface which is smooth to the touch, but on which the individual fibers appear to stand out. The heterogeneous fiber arrangement at the surface, as well as throughout the mass, make the chair base appear scratched all over. The initial impression created is that the chair base is badly scratched. This appearance is nevertheless pleasing, and is a decided advantage, since under actual wear, the appearance of the chair will remain unchanged.

It is obvious that the new type of surface for fiber-reinforced plastics, disclosed herein, make the surface well adapted for use in plastic automobile bodies and trim panels, and for all types of structural panel members. Panel members with the new finish are especially suited for use wherever there is abrasion wear, such as in desk tops and side panels, shop counter fronts, paneling for building purposes, baseboard trim, and in toys.

I claim as my invention:

1. The method of making a molded article of a synthetic molding resin reinforced with fibers and having an abrasion camouflaging surface, comprising forming a mass of fibers into a desired shape, applying a binder material to said fibers, whereby the fibers in the preform are temporarily adhered in shape by the binder material, applying a coating resin, characterized by its resinophobic properties after setting, to coat the surface fibers only of said shaped mass, setting said binder and resinophobic coating resin, filling said shaped fibers with a molding resin, and curing said reinforced molding resin.

2. The process of claim 1 wherein the fibers are glass fibers.

3. The method of making a molded base supporting member, for a swivel chair, of synthetic resin reinforced with glass fibers, and having an abrasion camouflaging surface, comprising forming a mass of glass fibers into the desired shape for the base supporting member, incorporating a binder in said mass of fibers, whereby the fibers in the preform are temporarily adhered in shape by the binder material, applying a water-soluble coating resin, characterized by its resinophobic properties after setting, to coat the surface fibers only of said shaped mass, setting said binder and resinophobic coating resin, then impregnating the shaped mass of glass fibers with a molding resin, and curing the thus reinforced molding resin in a mold.

4. The method of making a molded article of a synthetic molding resin reinforced with fibers, and having an abrasion camouflaging surface, comprising forming a mass of glass fibers and dry binder into a desired shape by suction, whereby the fibers in the preform are temporarily adhered in shape by the binder material, spraying the surface fibers only of said shaped mass with a solution of a water-soluble polyester coating resin, setting said binder and polyester coating resin, impregnating said shaped mass with a polyester molding resin, and curing the thus reinforced molding resin in a mold.

References Cited in the file of this patent
UNITED STATES PATENTS

| | | |
|---|---|---|
| 2,298,295 | Hyatt et al. | Oct. 13, 1942 |
| 2,354,110 | Ford et al. | July 18, 1944 |
| 2,372,048 | Auxier | Mar. 20, 1945 |
| 2,437,799 | Yorke | Mar. 16, 1948 |
| 2,550,465 | Gorski | Apr. 24, 1951 |
| 2,552,124 | Tallman | May 8, 1951 |
| 2,566,619 | Lyon et al. | Sept. 4, 1951 |
| 2,589,008 | Lannan | Mar. 11, 1952 |
| 2,649,396 | Witt et al. | Aug. 18, 1953 |
| 2,650,184 | Biefeld | Aug. 25, 1953 |
| 2,688,580 | Fingerhut | Sept. 7, 1954 |